T. O. PERRY.
FLUID PRESSURE CONTROLLER.
APPLICATION FILED FEB. 4, 1908.

920,491.

Patented May 4, 1909.
3 SHEETS—SHEET 1.

WITNESSES:
Herbert J Day
Grace R. Brown

INVENTOR
Thomas O. Perry.

T. O. PERRY.
FLUID PRESSURE CONTROLLER.
APPLICATION FILED FEB. 4, 1908.

920,491.

Patented May 4, 1909.
3 SHEETS—SHEET 2.

WITNESSES:
Herbert J. Day.
Grace R. Brown.

INVENTOR
Thomas O. Perry.

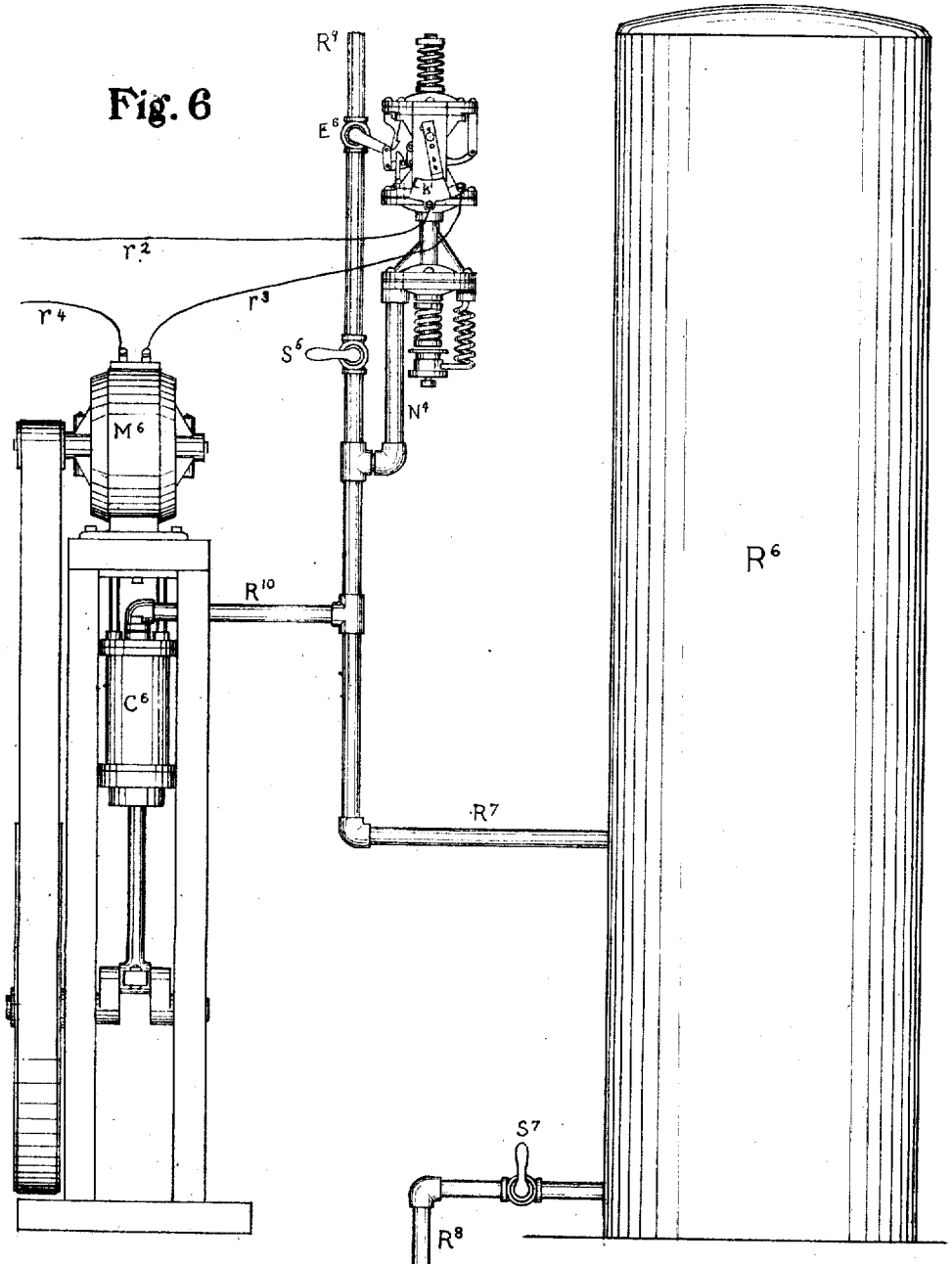

UNITED STATES PATENT OFFICE.

THOMAS O. PERRY, OF CHICAGO, ILLINOIS.

FLUID-PRESSURE CONTROLLER.

No. 920,491.  Specification of Letters Patent.  Patented May 4, 1909.

Application filed February 4, 1908. Serial No. 414,289.

*To all whom it may concern:*

Be it known that I, THOMAS O. PERRY, a citizen of the United States, residing at Chicago, in the county of Cook and State of Illinois, have invented a new and useful Improvement in Fluid-Pressure Controllers, of which the following is a specification.

My invention relates to improvements in fluid pressure controllers for reversing signals, throttles and other reversible mechanisms, and, especially, for stopping and starting or regulating the speed of motors used to force fluid into a reservoir, so that the fluid pressure may be maintained within determinable maximum and minimum limits of tension; and the objects of my improvements are, first, to provide great reliability and positiveness of control; second, to secure control within narrow ranges of pressure; and third, to facilitate accurate adjustment of both the degree and the range of the fluid pressure. I attain these objects by the mechanism illustrated in the accompanying drawing, in which—

Figure 1:
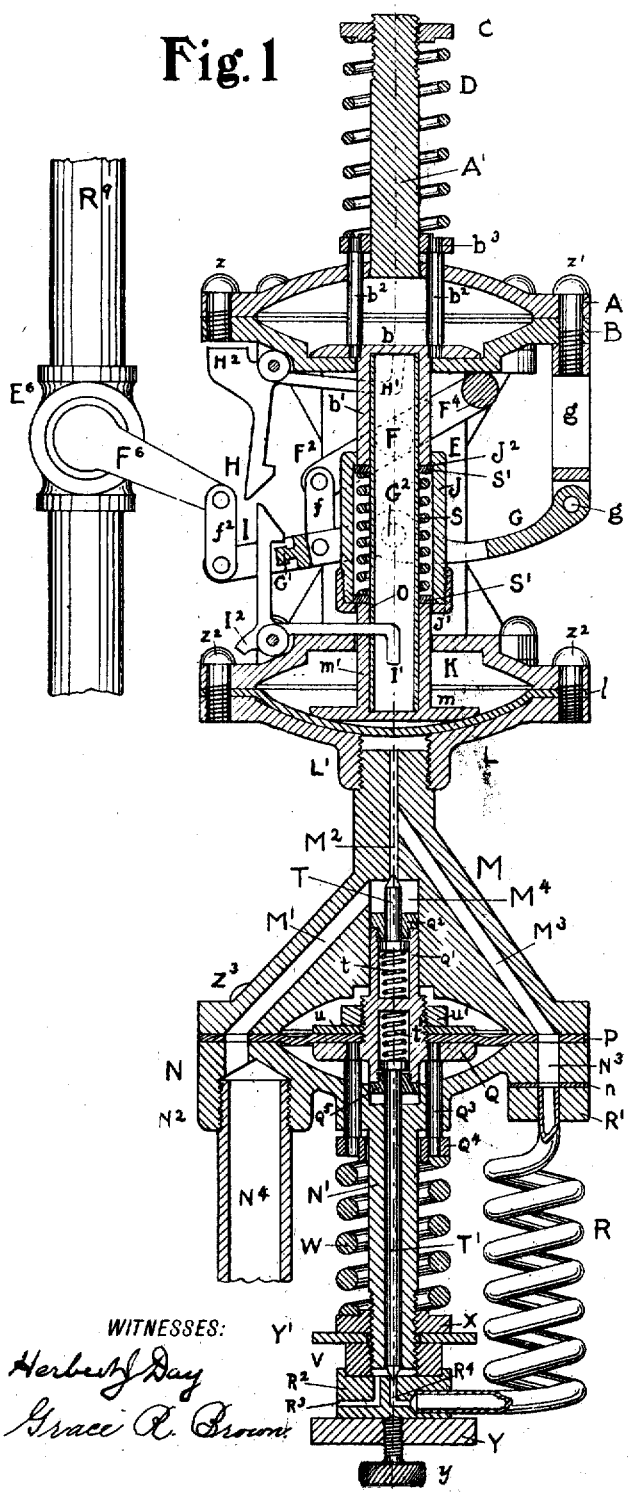
Figure 2:
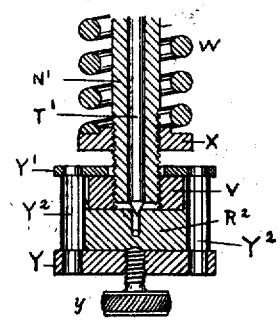
Figure 3:
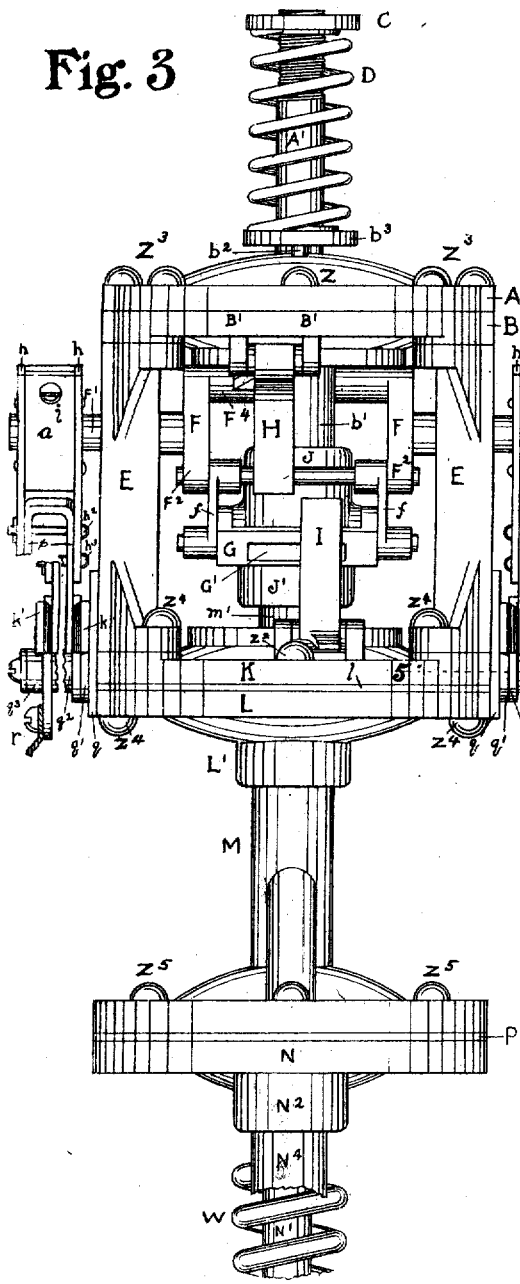
Figure 4:
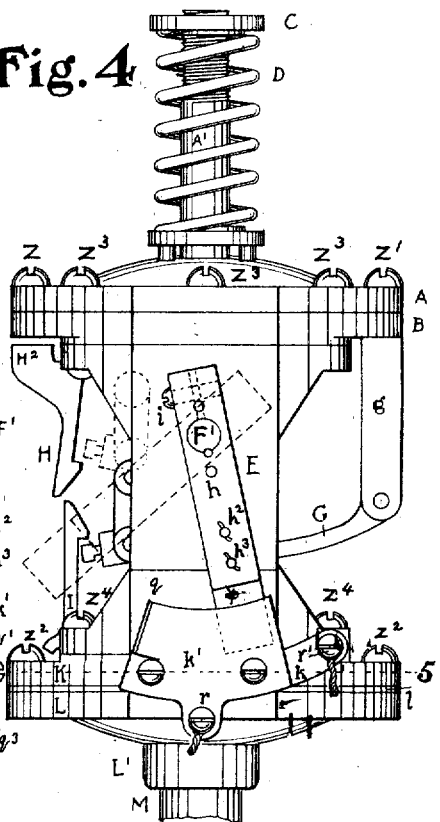
Figure 5:
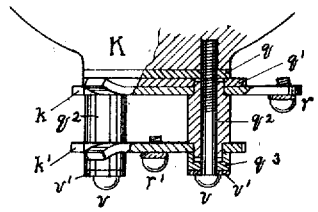

Figure 1 is a vertical section of the entire apparatus; Fig. 2, a vertical section of the extreme lower part of the apparatus taken in a plane at right angles to that of Fig. 1; Fig. 3, an exterior side view in elevation, omitting the extreme lower part of the apparatus; Fig. 4, an exterior front view of the upper portion of the apparatus; Fig. 5, a sectional plan of certain parts on the line 5—5 of Figs. 3 and 4; and Fig. 6, a diagram illustrating the application of my invention.

Similar letters refer to similar parts throughout the several views.

The pipe, $N^4$, which leads from and may be considered a part of the air reservoir, $R^5$, screws into a boss on the underside of the periphery of a circular casting, N, whose upper surface, within the plain annular periphery, is centrally concave. A flexible controlling diaphragm, P, is clamped between the upper plain periphery of casting, N, and the under side of casting, M, whose plain annular periphery and central concavity match and oppose the corresponding parts of casting, N. Diaphragm, P, is perforated at its center and tightly clamped between a diaphragm plate, Q, and a washer, $u$, by means of a nut, $u^1$, which screws on to a central hub of plate, Q, reaching up through the perforation in the diaphragm. A perforated plug, $Q^2$, is placed within a cavity in the upper extension of the hub of plate, Q, and likewise a perforated plug, $Q^3$, is placed within a cavity in the lower extension of the hub. The plug, $Q^2$, is loosely guided in a central cylindrical opening, $M^4$, in casting, M, and the plug, $Q^5$, is loosely guided in a central cylindrical opening in casting, N, so that the two plugs may move vertically simultaneously in unison with any flexure of the controlling diaphragm. It should be understood that the plug $Q^2$ and hub $Q^1$ are each fitted to substantially fill the cylindrical opening $M^4$ with only sufficient looseness to enable them to move freely therein. This construction, while incapable of being illustrated in the drawing, in practice enables the air from the duct $M^1$ to slowly pass through the space surrounding said parts so as to exert its pressure against the upper side of the diaphragm P as, and for the purpose hereinafter described.

A small central air duct, $M^2$, extends up from the central cylindrical opening of casting, M. The lower end of duct, $M^2$, is closed by a conical inlet valve, T, whose stem is loosely guided in the perforated plug, $Q^2$, and has a flat head thrust against the inner end of the plug by means of a helical buffer spring, $t$, inclosed in the upper cavity of the hub of plate, Q. In like manner, another conical outlet valve, $T^1$, whose stem passes loosely through the perforated plug, $Q^5$, and has a flat head over the inner end of the plug is constantly thrust downward by the helical buffer spring, $t^1$. The stem of outlet valve, $T^1$, is also guided and reaches down for some distance through a tubular pendant, $N^1$, hanging from a central exterior boss of casting, N, the conical outlet valve, $T^1$, protruding slightly below the lower end of pendant, $N^1$, which is threaded externally to receive the tension nut, X, and also the range nut, V. A thrust ring, $Q^4$, loosely surrounds the tubular pendant, $N^1$, and is rigidly connected with the diaphragm plate, Q, by means of two opposite pillars, $Q^3$, which loosely extend through the exterior central boss of casting, N. A tension spring, W, surrounds the pendant $N^1$, and is compressed between the thrust ring, $Q^4$, and the tension nut, X, by means of which the tension of the spring is regulated. The range nut, V, protrudes slightly below the lower end of pendant, $N^1$, and has its lower surface held in close central contact with a cylindrical terminal, R², centered against the range nut by a shallow annular rib inclosing the lower end of the nut.

A small outlet duct, R⁴, terminating centrally in the upper face of terminal, R², is normally closed by the conical outlet valve, T¹, and communicates by means of a flexible tube, R, with air duct, N³, passing vertically through the annular periphery of casting, N, and thence with air duct, M², through the inclined duct, M³. The other inclined duct, M¹, affords communication between the central cylindrical opening, M⁴, and the air supply pipe, N⁴. For convenience in adjusting the range nut, V, and holding its lower face against the upper face of the terminal, R², these two faces are held together by means of a clamp, Y, Y¹, Y², y, of which, Y, is a disk underneath the terminal R².

Y¹, is a flat ring resting on top of the range nut, V, and loosely surrounding the pendant, N¹. The disk, Y, and ring, Y¹, are tied rigidly together on opposite sides by the ties, Y². The center of the disk, Y, is pierced and threaded to receive the clamping screw, y, which, when loosened, allows the range nut, V, to be screwed up or down so as to raise or depress the terminal, R². A small waste duct, R³, leads from the upper face of the terminal, R², within the aperture of the range nut, V, to the open air.

It would be possible to dispense with the clamp, Y, Y¹, Y², y, if the flexible tube, R, were also made to act as a spring under tension pressing together the adjoining faces of the terminal, R², and range nut, V. As shown, the terminal, R², is raised sufficiently so that both the outlet duct, R⁴, and the inlet duct, M², are tightly closed, by the tension of the buffer springs, t and t¹, pressing against the two valve stem heads, one or both of which should be more or less separated from the limiting plugs, Q², Q⁵, for all positions that the controlling diaphragm, P, may assume, so that neither of the conical valves, T, T¹, can be unseated without first seating the other.

The upper part of casting, M, terminates in a threaded neck, which screws into a boss, L¹, on the under side of a casting, L, having a concave upper surface within a plain annular periphery, which is separated from a casting, K, concave on its under surface within a plain annular periphery, matching that of casting, L, by a flexible motor diaphragm, l, whose outer border is clamped between the two annular borders by means of screws, Z². Directly over casting, K, at some distance, is a similar casting, B, whose concave surface faces upward and whose plain annular periphery is matched by that of a casting, A, concave underneath and resting directly upon casting, B, to which it is secured by means of the screws, Z. Castings B and K, are rigidly connected at their borders by two pillars, E, E, placed diametrically opposite each other, and secured by means of the screws, Z³, Z⁴. A central circular opening in casting, K, serves to loosely guide the tubular shoulder, m¹, of a thrust plate, m, which rests upon the motor diaphragm, l. A similar central opening in casting, B, likewise serves to guide the tubular shoulder, b¹, of the thrust plate, b. The two thrust plates, b and m, butt against opposite ends of a connecting tube, O, whose extremities are inclosed for some distance by the tubular shoulders, b¹, m¹, leaving between these shoulders a considerable interval. Both thrust plates thus connected are adapted to move together vertically through a distance limited by their inclosing chambers.

Two vertical posts, b², b², pass loosely through the wall of casting, A, and rigidly connect the thrust plate, b, with a thrust ring, b³, located centrally over casting, A, from which a cylindrical standard, A¹, rises through the thrust ring and is threaded at its upper end to receive a thrust nut, C, between which and the thrust ring, b³, a helical reversing spring, D, is compressed around the standard.

A hollow cylindrical cage, J, has narrow internal flanges, J¹, J², at each end, which are guided loosely upon the tubular shoulders, b¹ and m¹, the flange, J¹, being part of a cap screwed onto the lower end of the cage. Buffer washers, S¹, loosely fitting the interior of the cage, J, and the exterior of the connecting tube, O, are constantly thrust apart by a helical snap spring, S, compressed between the washers within the annular space around the interior of the cage, J, and exterior of tube, O, the outward movement of the washers being limited either by the internal flanges, J¹, J², or by the tubular shoulders, b¹, m¹, which are adapted to compress the snap spring from either above or below to the extent of their limited movements. The tension of the snap spring, S, must always be less than that of the reversing spring, D. Midway between castings, B, and K, a snap lever, G, is fulcrumed at one end to a pendent fulcrum, g, suspended beneath the periphery of casting, B, on one side, by means of the screw, Z¹, and between its extremities this snap lever divides and is connected to opposite sides of the motor cage, J, by means of pivotal trunnions, G², which are midway between the ends of the cage, and are adapted to move equally above and below a horizontal plane containing the fulcrum axis, g¹. Near the other extremity of the lever, G, on the opposite side of the cage from the fulcrum, are pivoted the lower ends of two links, f, f, on either side, these links at their upper ends being pivoted to the ends of arms, F², F¹, which extend to one side from a rock shaft, F, having bearings in the two pillars, E, E. The axis of rock shaft, F, F, cuts the axis of the connecting tube, O, directly above the trunnions, G², but the two extremities of the shaft which extend through to some distance outside of the pillars, E, E, are rigidly joined by an offset, F⁴, which reaches around the tubular shoulder, b¹, and cage, J. The free end of snap lever, G, just beyond the links, f, f, is adapted to engage at its extreme upper and lower positions with two retaining latches, H, and I, which are pivoted, one to the under side of casting B, and the other to the upper side of casting K, between suitable ears on each. These two latches have similar horizontal arms, H¹, I¹, which extend inward and to the side of the tubular shoulders, b¹, m¹, their inner ends turning upward at H¹ and downward at I¹, so as to engage the thrust plates b, and m, for unlatching lever, G, whenever either of these thrust plates approaches the limit of its movement inward. The latches will catch the end of the motor lever, G¹, automatically by reason of the counterweight, H², on the latch H, and by reason of the weight of the arm, I¹, on the latch, I. Excess of unlatching movement is prevented by the stop, I², on the latch, I, and by counterweight, H², on latch, H, encountering respectively the peripheries of castings, K, and, B.

The construction as so far shown and described will make it evident that a fluid tension admitted through the inlet pipe, N⁴, will by passing between the space surrounding the parts Q² Q¹ tend to depress the controlling diaphragm, P, and when sufficient to overcome the contrary action of tension spring, W, the depression of diaphragm, P, will unseat the inlet valve, T, and admit fluid pressure beneath the motor diaphragm, l, which, in consequence, will push up the thrust plate, m, to the limit of its movement. This action compresses the reversing spring, D, and also compresses the snap spring, S, but does not move the latched snap lever, G, until the movement of the thrust plate, m, approaches its limit so as to unlatch the snap lever which, when released, by reason of the reaction of the snap spring, S, springs suddenly upward and is caught by the latch, H. Thus a quick rocking of the shaft, F, is effected in one direction whenever the fluid tension increases sufficiently to overcome whatever resistance is given at will to the tension spring, W, by means of the tension nut, X. Having been rocked in one direction, the shaft, F, is held in that position until a reduction of fluid tension takes place sufficient to allow the tension of the spring, W, to prevail and unseat the outlet valve, T¹, when the fluid escaping from beneath the motor diaphragm, l, allows the reversing spring, D, to react and compress the weaker snap spring, S, in the reverse direction until the thrust plate, b, pushes the latch, H, away from the snap lever, G, which then springs suddenly downward and is caught by the latch, I, thus effecting quickly a reverse rocking of the shaft, F. The action of the snap spring, S, and its effect is precisely the same in both directions. The range of action, or difference in fluid tensions between that required to effect a rocking of the shaft in one direction and that which will cause a reversal thereof, may be made more or less according as the range nut, V, is screwed up or down, causing the outlet port, R⁴, to approach or recede from the inlet port, M². Raising the outlet port, R⁴, compresses the buffer springs, t, t¹, or at least one of them, so that the controlling diaphragm, P, requires greater flexure to effect the unseating of either of the conical valves, T, T¹, from the position at which the other valve was seated. The extreme sensitiveness of the apparatus is due to the circumstance that a very small amount of flexure of the controlling diaphragm, P, may suffice to unseat one of the valves, T, T¹, after the other is seated, and a great range of action is provided for, if desired.

The uses to which this apparatus may be applied are various. Valves, switches, signals, etc., may be operated at a distance by effecting a small variation of fluid pressure in a pipe of any length between the apparatus and the means for changing the fluid pressure. It can be used to maintain a certain head of water in a tank, or to keep the tension of air or gas in a reservoir within narrow limits. In Fig. 6 is shown a diagram to indicate how a certain air pressure may be maintained in a reservoir, R⁶, by using this device to operate a throttle or shut off cock, E⁶, which controls the flow into the reservoir of air from any source of pressure higher than is desired in reservoir, R⁶. Or the compressed air may be supplied by an air compressor, C⁶, operated by an electric motor, M⁶, where it is needed to make and break the electric circuit which operates the motor. The arrangement of an electric switch for this purpose and its method of attachment to the apparatus is shown in Figs. 3, 4, 5 and 6. Two metal contact plates, k, k¹, having vertical parallel surfaces separated from each other by insulating blocks, q², and each completely insulated by insulating material, q, q¹, q², q³, on all sides, are supported directly underneath either projecting terminal, F¹, of shaft, F, being secured to each other and to casting, K, by means of two clamping screws, r, which pass through the lower edges of the plates, from which also they are insulated on all sides by the insulating material as shown. To these insulated plates, k, k¹, by means of the binding screws, r, r¹, are attached the terminals of two wires, $r^2$, $r^3$, forming part of an electric circuit by which the actuating current is conducted through the electric motor, $M^6$. For closing the electric circuit, a switch, $p$, preferably made of elastic sheet bronze, bent in the form of an inverted letter U, is adapted to span with its terminals the space between the parallel interior surfaces of the contact plates, $k$, $k^1$, and press against them firmly by reason of its elasticity. This switch, $p$, is carried between the outer ends of two flat arms made of insulating fiber, $h$, $h$, by means of two pins, $h^2$, $h^3$, which pierce the switch loosely near its inner bent part and are secured in holes through the fiber by heads and keys. The inner heads of these fiber arms, $h$, $h$, are pierced to receive the end, $F^1$, of shaft, F, and are riveted against opposite sides of a hub, $a$, which is keyed to the shaft end, $F^1$, in such position that the switch, $p$, will be carried into contact between the contact plates, $k$, $k^1$, whenever snap lever, G, moves downward, and will be carried out away from the contact plates whenever the lever, G, moves upward, as indicated by the broken lines. Thus the electric circuit is broken by increase of air pressure in the reservoir, stopping the motor, and is made again through diminution of pressure restarting the motor as required. The contact plates, $k$, $k^1$, are bent outward where the switch, $p$, enters between them so that the entrance may be effected easily with a glancing initial contact. The switch, $p$, has a sliding contact for considerable distance, both in making and breaking the electric circuit, and the contact is neither made nor broken at the instant of unlatching the snap lever, G, but after the snap spring S, has gained great momentum, so that the contacts are made and broken with extreme abruptness, as is very desirable in some cases. In other cases, if it should be desirable to have a slow movement of the lever, G, in one direction, one of the latches, as H, for example, might be omitted; then if the duct, $M^2$, is made sufficiently small in area, the fluid pressure will escape underneath diaphragm, $l$, slowly, compelling a slow downward movement of the lever, G, without in the least abbreviating the celerity of the upward movement. Slow movements in both directions may be effected by omitting both latches, H, I, and these reverse movements, up and down, may be timed independently of each other by simply regulating the area of duct, $M^1$, for the upward movement of the lever, G, and the area of, $M^2$, for the downward movement. If both of the latches, H, I, should be omitted in order to effect slow movement in special cases, the snap spring, S, would not yield and might be dispensed with by securing the opposite ends of cage, J, to the tubular shoulders, $b^1$, $m^1$. This would also render useless the guide tube, O, which is not an absolute necessity, even when the snap spring is used as shown.

The starting and stopping of some kinds of electric motors require the making and breaking of two separate electric circuits, and it is sometimes required in single electric circuits that the motor shall be entirely cut off from electrical connection by breaking the circuit in two places. As shown in Fig. 3, both ends, $F^1$, of the rock shaft, F, may carry electric switches, $p$, $p$, to operate in connection with contact plates, $k$, $k^1$, attached in precisely the same manner on opposite sides of casting, K. Or one of the ends of rock shaft, F, may carry a switch to control an electric motor and the other terminal may connect directly with the controlling throttle of a pressure supply pipe. As illustrated in Figs. 1 and 6, the lever, G, may be directly connected with throttles, valves, signals, etc., without the intervention of the rock lever, F, which is used as a convenience of form and to obtain greater angular movement than lever, G, directly affords.

Another application of my invention is to shut off delivery of air from reservoir, $R^6$, whenever the tension falls below a desired limit, or below a degree of tension required to effectively operate any mechanism to which compressed air may be applied as the actuating medium. For this purpose, let $R^9$, represent the delivery pipe whose controlling throttle, $E^6$, is directly connected with the snap lever, G, by means of the link, $f^2$. Throttle, $E^6$, in this case, must close when snap lever, G, is depressed and open with the contrary movement. Reservoir, $R^6$, may be supplied with fluid pressure either by the pump, $C^6$, or from any other source, through the pipe, $R^8$.

In still another application of this invention, let $R^6$ represent either a closed water tank or a stand pipe, in which water may rise considerably above the level of the controller, so that the fluid tension may be due either to compressed air entrapped above the surface of the water or to the natural head of water in the stand pipe. Water, in this case, is supplied to the reservoir through the pipe, $R^3$, whose throttle, $E^6$, must be opened whenever snap lever, G, is depressed and closed with the contrary movement.

Without limiting myself to the aforesaid illustrations, what I claim and desire to secure by Letters Patent, is:

1. In a fluid pressure controller, the combination of inlet and outlet ports, inlet and outlet valves adapted to seat against said ports and to be unseated therefrom, a diaphragm adapted to seat one and unseat the other of said valves by flexure in one direction either way, flexible connections between said diaphragm and said valves whereby either valve, after seating, may yield and allow unseating of the other valve, a supply duct to convey fluid pressure against one side of said diaphragm, and a tension spring which reacts against said diaphragm contrary to the fluid pressure, substantially as herein set forth.

2. In a fluid pressure controller, the combination of inlet and outlet ports, inlet and outlet valves, adapted to seat against said ports and to withdraw therefrom, a diaphragm adapted to seat one and unseat the other of said valves by flexure in one direction either way, buffer connections, whereby the flexure of said diaphragm may continue in the same direction after either of said valves is seated, a supply duct to convey fluid pressure against one side of said diaphragm, and a tension spring which reacts against said diaphragm contrary to the fluid pressure, substantially as herein set forth.

3. In a fluid pressure controller, the combination of inlet and outlet ports, inlet and outlet valves adapted to seat against said ports, or to withdraw therefrom, a diaphragm adapted to seat one and unseat the other of said valves by flexure in one direction either way, buffer springs, subject to compression by the seating of said valves, a supply duct adapted to convey fluid pressure against one side of said diaphragm, and a tension spring which reacts against said diaphragm contrary to the fluid pressure, substantially as herein set forth.

4. In a fluid pressure controller, the combination of inlet and outlet ports, inlet and outlet valves adapted to seat against said ports, or to withdraw therefrom, a diaphragm adapted to seat one and unseat the other of said valves by flexure in one direction either way, buffer springs under tension subject to further compression by the seating of said valves, limiting stops to hold said buffer springs under tension after the unseating of said valves, a supply duct adapted to convey fluid pressure against one side of said diaphragm, and a tension spring which reacts against said diaphragm contrary to the fluid pressure, substantially as herein set forth.

5. In a fluid pressure controller, the combination of inlet and outlet ports, inlet and outlet valves adapted to seat against said ports, or to withdraw therefrom, a diaphragm adapted to seat one and unseat the other of said valves by flexure in one direction either way, buffer springs subject to compression by the seating of said valves, a supply duct for admitting fluid pressure against one side of said diaphragm, a tension spring which reacts against said diaphragm contrary to the fluid pressure, and means for adjusting the amplitude of flexure required of said diaphragm between the seating of one and the unseating of the other of said valves, substantially as herein set forth.

6. In a fluid pressure controller, the combination of inlet and outlet ports, inlet and outlet valves adapted to seat against said ports or to withdraw therefrom, a diaphragm adapted to seat one and unseat the other of said valves by flexure in one direction either way, buffer springs subject to compression by the seating of said valves, a supply duct for admitting fluid pressure against one side of said diaphragm, a tension spring which reacts against said diaphragm contrary to the fluid pressure, and means for adjusting longitudinally the position of one of said ports in the direction of the seating or unseating movement of its valve, substantially as herein set forth.

7. In a fluid pressure controller, the combination of an inlet port and an outlet port oppositely placed facing inward, inlet and outlet valves adapted to seat outwardly against said ports, or to withdraw inwardly therefrom, an inlet duct leading from said inlet port to reversing mechanism, to be operated thereby an outlet duct leading from said inlet duct to said outlet port, a diaphragm located between said valves and adapted to seat one valve and unseat the other by flexure in one direction either way, buffer springs subject to compression by the seating of said valves, a supply duct for admitting fluid pressure against one side of said diaphragm, and a tension spring which reacts against said diaphragm contrary to the fluid pressure, substantially as herein set forth.

8. In a fluid pressure controller, the combination of an inlet port and an outlet port oppositely placed facing inward, inlet and outlet valves adapted to seat outwardly against said ports, or to withdraw inwardly therefrom, an inlet duct leading from said inlet port to reversing mechanism to be operated, an outlet duct leading from said inlet duct to said outlet port, a diaphragm located between said valves and adapted to seat one valve and unseat the other by flexure in one direction either way, buffer springs subject to compression by the seating of said valves, a supply duct for admitting fluid pressure against one side of diaphragm contrary to the fluid pressure, and means for adjusting the distance between said oppositely placed ports, substantially as, and for the purpose herein set forth.

9. In a fluid pressure controller, the combination of an inlet port and an outlet port oppositely placed facing inward, inlet and outlet valves adapted to seat outwardly against said ports or to withdraw inwardly therefrom reversing mechanism, an inlet duct leading from said inlet port to said reversing mechanism, a flexible tubular outlet duct interposed between said outlet port and said inlet duct, a diaphragm located between said valves and adapted to seat one valve and unseat the other by flexure in one direction either way, buffer springs subject to compression by the seating of said valves, a supply pipe for admitting fluid pressure against one side of said diaphragm, a tension spring which reacts against said diaphragm contrary to the fluid pressure, and means for adjusting the position of said outlet port in the direction, or away from said oppositely placed inlet port, substantially as and for the purpose herein set forth.

10. In a fluid pressure controller, the combination with means for controlling the inflow and escape of pressure fluid, of a motor diaphragm adapted to be flexed by pressure of fluid against one side, a reversing spring reacting against said diaphragm contrary to the fluid pressure, a snap spring adapted to receive compression from opposite directions, connections whereby said snap spring is compressed in one direction by said diaphragm flexure and in the opposite direction by said reversing spring, a snap lever reversible in movement through the action of the snap spring, retaining latches adapted to hold the snap lever from opposite directions while the snap spring is being compressed, and mechanism whereby said latches are released after compression of said snap spring, substantially as herein set forth.

11. In a fluid pressure controller, the combination with means for controlling the inflow and escape of fluid pressure, of a motor having reciprocating parts operable by the admission and escape of said fluid pressure, a snap lever adapted to receive reverse movements, elastic actuating connection between said snap lever and said reciprocating parts, retaining mechanism adapted to interrupt the movement of said snap lever during part of the movement of said reciprocating parts, and means for disengaging said retaining mechanism after further movement of said reciprocating parts, whereby the power stored in said elastic actuating connection is released to effect a quick movement of said snap lever, substantially as herein set forth.

12. In a fluid pressure controller, the combination with means for controlling the inflow and escape of fluid pressure, of a motor having reciprocating parts operable by the admission and escape of said fluid pressure, a snap lever adapted to receive reverse movements, a snap spring carried by said snap lever and adapted to receive compression by the action of said reciprocating parts, retaining mechanism adapted to interrupt the movement of said snap lever during part of the movement of said reciprocating parts, and means for disengaging said retaining mechanism after further movement of said reciprocating parts, whereby the power stored in said snap spring is released to effect a quick movement of said snap lever, substantially as herein set forth.

13. In a fluid pressure controller, the combination with means for controlling the inflow and escape of fluid pressure, of a motor having reciprocating parts operable by the admission and escape of said fluid pressure, a snap lever adapted to receive reverse movements, a snap spring carried by said snap lever and adapted to yield through contact with said reciprocating parts, retaining mechanism adapted to interrupt the movement of said snap lever during part of the movement of said reciprocating parts, and means for disengaging said retaining mechanism after further movement of said reciprocating parts, whereby the power stored in said snap spring is released to effect a quick movement of said snap lever, substantially as herein set forth.

THOMAS O. PERRY.

Witnesses:
 GRACE R. BROWN,
 HERBERT J. DAY.